(12) United States Patent
Caliendo, Jr. et al.

(10) Patent No.: US 10,321,204 B2
(45) Date of Patent: Jun. 11, 2019

(54) INTELLIGENT CLOSED CAPTIONING

(71) Applicant: Lenovo (Singapore) Pte. Ltd., Singapore (SG)

(72) Inventors: Neal Robert Caliendo, Jr., Raleigh, NC (US); Russell Speight VanBlon, Raleigh, NC (US); Arnold S. Weksler, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 410 days.

(21) Appl. No.: 14/329,374

(22) Filed: Jul. 11, 2014

(65) Prior Publication Data

US 2016/0014476 A1    Jan. 14, 2016

(51) Int. Cl.
| | | |
|---|---|---|
| G10L 15/00 | (2013.01) |
| H04N 21/81 | (2011.01) |
| H04N 21/488 | (2011.01) |
| H04N 21/439 | (2011.01) |
| H04N 21/422 | (2011.01) |

(52) U.S. Cl.
CPC ..... H04N 21/8133 (2013.01); H04N 21/4394 (2013.01); H04N 21/4396 (2013.01); H04N 21/4884 (2013.01); H04N 21/42201 (2013.01); H04N 21/42206 (2013.01)

(58) Field of Classification Search
CPC ......... G10L 15/00; G10L 15/07; G10L 15/20; G10L 15/22; G10L 15/24; G10L 15/25; G10L 2015/00; G10L 2015/22; G10L 2015/225; G10L 2015/226; G10L 2015/227; G10L 2015/228
USPC ..... 704/235, 231, 246, 250, 257, 270.1, 275
See application file for complete search history.

(56) References Cited

U.S. PATENT DOCUMENTS

| | | | | |
|---|---|---|---|---|
| 6,480,819 B1 * | 11/2002 | Boman | ................... | G10L 15/26 704/257 |
| 6,993,246 B1 * | 1/2006 | Pan | .......................... | H04L 67/12 386/201 |
| 9,210,360 B2 * | 12/2015 | Mountain | .......... | H04N 21/4884 |
| 2005/0038661 A1 * | 2/2005 | Momosaki | .............. | G10L 25/00 704/275 |
| 2008/0043996 A1 * | 2/2008 | Dolph | ..................... | H04N 5/60 379/388.07 |
| 2010/0066904 A1 * | 3/2010 | Schindler | ........... | H04N 5/44513 348/468 |
| 2014/0046661 A1 * | 2/2014 | Bruner | ............... | H04N 21/4884 704/235 |

FOREIGN PATENT DOCUMENTS

| | | |
|---|---|---|
| CN | 100431342 C | 11/2008 |
| CN | 101461241 A | 6/2009 |

* cited by examiner

*Primary Examiner* — Qi Han
(74) *Attorney, Agent, or Firm* — Ference & Associates LLC

(57) ABSTRACT

An aspect provides a method, including: playing, on a display device, video content; providing, using at least one speaker, audio content associated with the video content; obtaining, from an external source, data relating to playback context; determining, using a processor, that the data relating to playback context is associated with a reduced audibility context; and providing, on the display device, textual data associated with dialog of the video content. Other aspects are described and claimed.

10 Claims, 3 Drawing Sheets

INTELLIGENT CLOSED CAPTIONING

BACKGROUND

Information handling devices ("electronic devices" or "devices"), for example smart TVs, flat panel displays, smart phones, tablet devices, laptop computers and the like are regularly used for watching videos (audio and video content). Often times a user will miss audio, for example if a sudden ambient noise occurs or an actor voices dialogue in a low-volume manner.

Content providers attempt to make video content more accessible by providing closed caption data that tracks the dialogue. This is helpful in some respects, although it is often not appropriately tailored to various media consumption situations. For example, the closed caption data is helpful but must be manually enabled. Thus, users often do not turn on the closed caption option until they have missed significant portions of dialogue. Similarly, for a user that is not hearing impaired, leaving the closed caption option on indefinitely, while useful in helping understand inaudible dialogue, often will interfere unnecessarily in the viewing experience.

BRIEF SUMMARY

In summary, one aspect provides a method, comprising: playing, on a display device, video content; providing, using at least one speaker, audio content associated with the video content; obtaining, from an external source, data relating to playback context; determining, using a processor, that the data relating to playback context is associated with a reduced audibility context; and providing, on the display device, textual data associated with dialogue of the video content.

Another aspect provides an electronic device, comprising: a display device; an input component; at least one speaker; one or more processors; and a memory operatively coupled to the one or more processors, the display device, the at least one speaker, and the input component, the memory storing instructions executable by the one or more processors, the instructions being executable by the one or more processors to: play, on the display device, video content; provide, using the at least one speaker, audio content associated with the video content; obtain, from an external source, data relating to playback context; determine that the data relating to playback context is associated with a reduced audibility context; and provide, on the display device, textual data associated with the dialogue of the video content.

A further aspect provides a computer program product, comprising: a storage device that stores instructions executable by a processor, the instructions comprising: instructions that play, on a display device, video content; instructions that provide, using at least one speaker, audio content associated with the video content; instructions that obtain, from an external source, data relating to playback context; instructions that determine, using a processor, that the data relating to playback context is associated with a reduced audibility context; and instructions that provide, on the display device, textual data associated with dialogue of the video content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
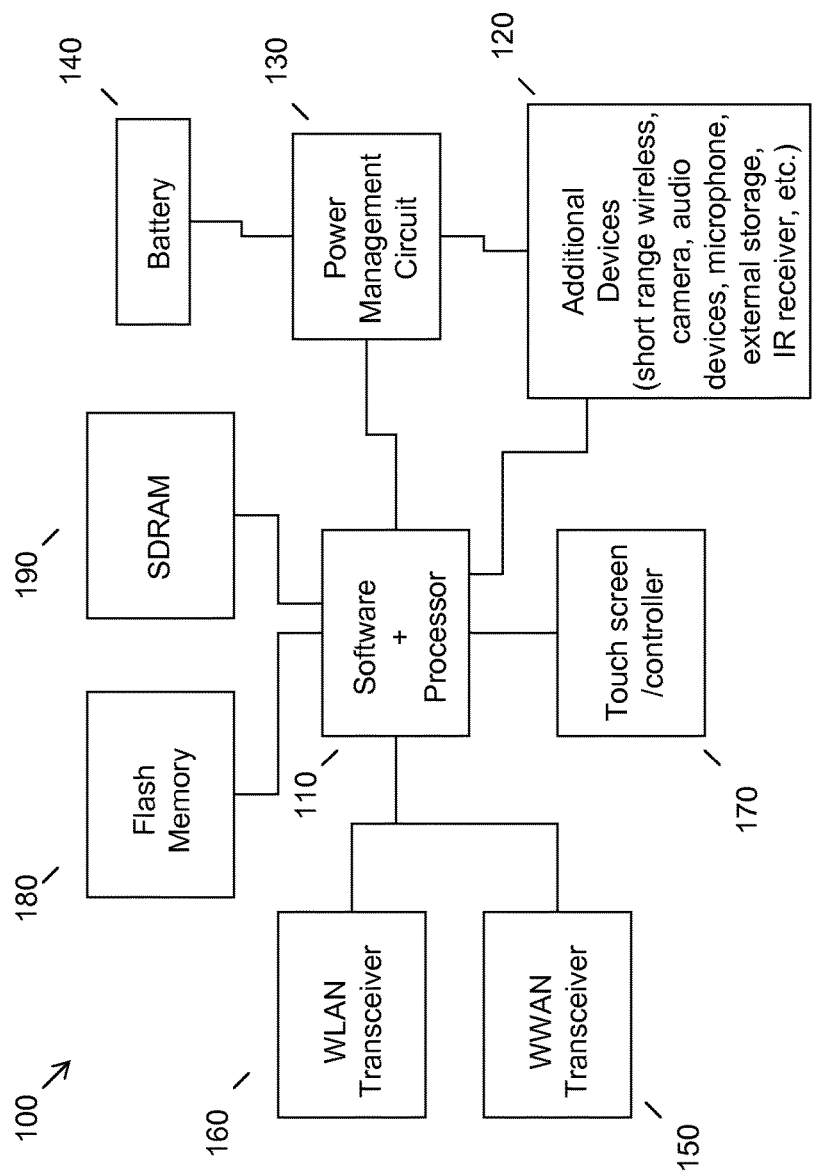
FIG. 1 illustrates an example information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Closed captioning is typically a viewing option. That is, the viewer chooses whether it is turned on or off during the entire video playback. A viewer normally may turn on closed captioning if he or she is hearing impaired, does not understand the primary language of the audio dialogue, or is in an environment where the audio cannot be increased sufficiently (e.g., a quite environment where increased audio is impermissible or a noisy environment where increasing the audio is futile).

Sometimes, however, only certain portions of the video may be difficult to understand. For example, there may be overwhelming background noise for a short period of time or an actor may not speak clearly for a brief segment of video playback. In these situations, the viewer can manually rewind the video, attempt to quickly increase the volume temporarily, or turn on closed captioning temporarily and replay the scene.

Subtitles are sometimes included, e.g., displayed when the content producer anticipates that most viewers will be able to hear but not understand the language or accent. For example, a person in a TV show or documentary may mumble something in the background or speak in a language different from the primary language. In these cases, the producer may force a subtitle to display so that viewers can understand what was said. However, such subtitles are predetermined and not customizable.

Accordingly, an embodiment provides methods for implementing intelligent closed captioning in reduced audibility contexts. For example, by monitoring context data, e.g., audio dialogue detectable by a microphone during the video playback and processed using speech recognition, an embodiment may automatically display text, e.g., the corresponding closed caption text, for portions of the video that are hard to understand. A determination as to which textual data (e.g., closed caption data) to display may be based on several factors.

For example, in an embodiment, a speech recognition engine may process the ambient audio and determine that the audio cannot be interpreted. This may be inferred for example by having an error response by the speech recognition engine, i.e., a determination by the speech recognition engine that the dialogue is literally incomprehensible. This may be refined, e.g., the speech recognition engine may be calibrated to use a statistical probability of the recognition, e.g., where statistically the recognition accuracy is low or of reduced confidence, the speech recognition engine may provide a determination that the closed caption data should be displayed.

As another example, an embodiment may use a straightforward determination to identify a reduced audibility context, e.g., an indication that the display device volume setting is at a level deemed too low to be heard. In such circumstances, an embodiment may display closed caption data such that the user may read the dialogue. In another example, an embodiment may detect a reduced audibility environment using display device control data other than a volume setting. For example, if a user rewinds the video playback one or more times, this may be mapped to a reduced audibility context, e.g., that the user needs to re-watch a scene to hear it properly.

In another example, an embodiment may detect that ambient noise in the viewing environment exceeds a threshold volume (e.g., a dog barking, person speaking, air conditioning system turning on, etc.). A user may configure a sound threshold (e.g., provide a setting to show closed caption data when a certain dB level is exceeded, a certain high-pitch/low-pitch sound occurs, etc.).

In another example, certain sounds that occur frequently in the viewing environment (e.g., ambulances driving by, dog barking, etc.) may be used, without regard to their amplitude, as a trigger for displaying text associated with the dialogue. A user may adjust such settings to listen carefully for certain types of sounds.

Another source of reduced audibility context data may be the user himself or herself. For example, if an embodiment detects that a user speaks a certain trigger phrase, such as "What did he say?", "Could you understand that?" or the like, an embodiment may use this as an indication that textual display of dialogue would be helpful. A collection of natural language wakeup words or phrases may be leveraged in this regard so that the system may automatically implement closed caption display and the user does not have to manually intervene to use this feature. In some contexts, reduced audibility contexts may be detected via selections of or inputs provided by the user, e.g., turning on the closed captioning with audio input or gesture input.

Although an embodiment may automatically rewind the video playback responsive to a determination that video playback is occurring in a reduced audibility environment, an embodiment may also include a textual reference to a preceding audio portion. Thus, the user may be apprised that the system is catching up with previously spoken dialogue by later presenting it in a text format. This may take a variety of forms, for example, a simple reference that the dialogue displayed as text refers back to a previously spoken line of dialogue. Moreover, depending on the data and/or processing capabilities available, an embodiment may include a specific reference, e.g., "Actor A said 'XYZ'." Thus, if confidence is high that a particular word/phrase is hard to hear/understand (audibility confidence is low), the closed caption data may need to be marked as applying to dialogue from a few seconds ago so that the user doesn't have to rewind and re-listen. The closed caption text may show a graphic, special characters, etc., to inform the user that the closed captioning being displayed is for previous dialogue. This may be helpful for example when a sudden noise occurs during dialogue that couldn't be detected ahead of time in the audio stream.

In addition, the viewer may selectively configure the system to turn on closed captioning only for a specific actor/actress in the video whom the viewer has difficulty understanding. The system can automatically recognize the actor's voice and turn on closed captioning while that actor is speaking using speaker recognition. Alternatively, an embodiment may examine the closed caption data to determine when the actor's dialogue appears and should be displayed.

The illustrated example embodiments will be best understood by reference to the figures. The following description is intended only by way of example, and simply illustrates certain example embodiments.

While various other circuits, circuitry or components may be utilized in information handling devices, with regard to smart phone, tablet or smart TV circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a microphone, a camera, an IR receiver, etc. Additional devices 120 also may include short range wireless radio(s), such as BLUETOOTH radios, for communicating with other devices over different types of networks, e.g., short range wireless or personal area networks. Near field communication element(s) may also be included as additional network component(s) or device(s) 120. Commonly, system 100 will include a touch screen/controller 170 for data input and display. System 100 also typically includes various memory devices, for example flash memory 180 and SDRAM 190.

Figure 2:
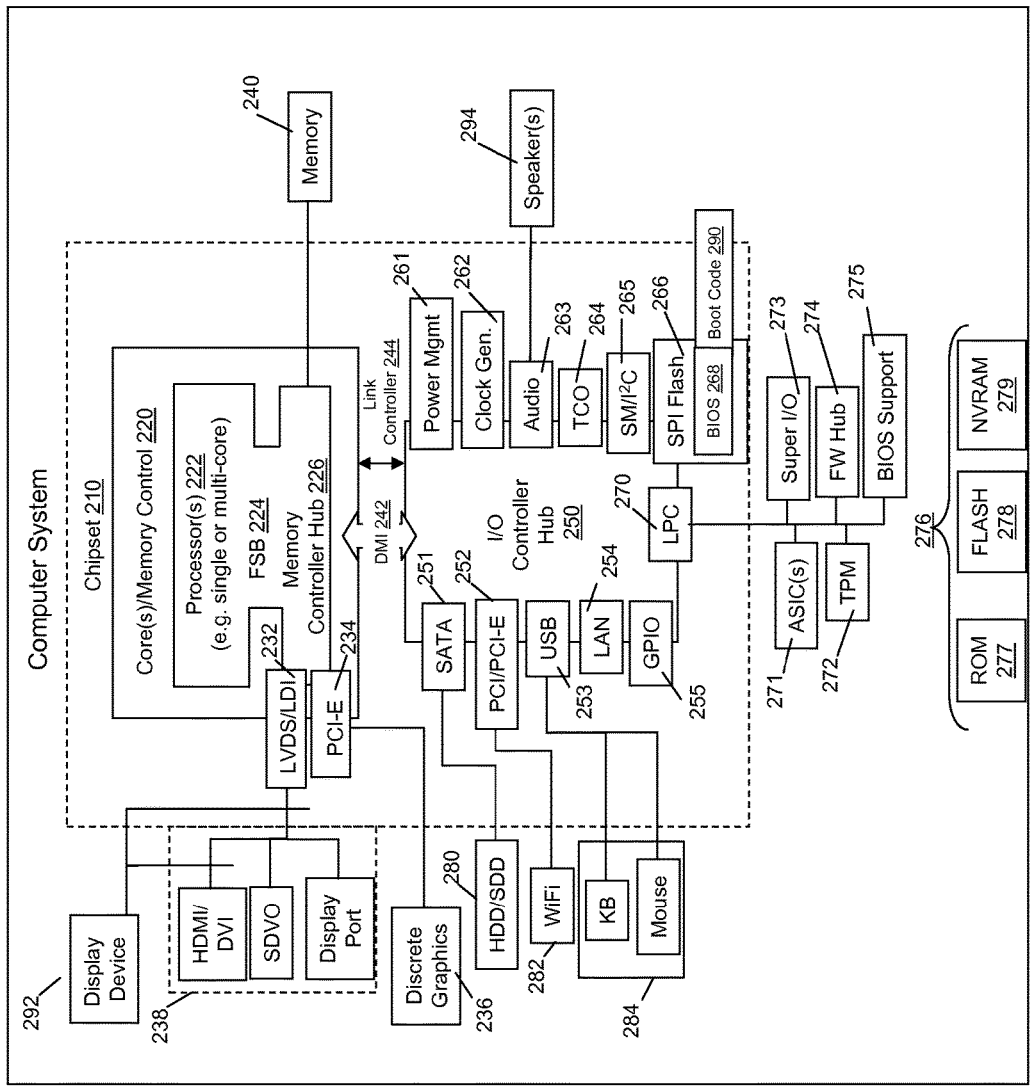
FIG. 2 illustrates another example information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computing devices generally, and/or other electronic devices with which users consume audio and video content. For example, the circuitry outlined in FIG. 1 may be implemented in a tablet or smart phone embodiment, whereas the circuitry outlined in FIG. 2 may be implemented in a laptop PC embodiment. In certain contexts, more than one device may be used, e.g., in a distributed processing context. For example, a user's smart phone may capture ambient audio and relay the same back a device including the display and speakers for further processing, as outlined herein. Other distributed system examples are possible.

As described herein, an embodiment may display, e.g., on display 170 or 292 of FIG. 1 and FIG. 2, respectively, video content. In connection with display of the video content, an embodiment may provide, e.g., using at least one speaker such as speakers 294 of FIG. 2, audio content associated with the video content, e.g., dialogue of the video content.

Figure 3:
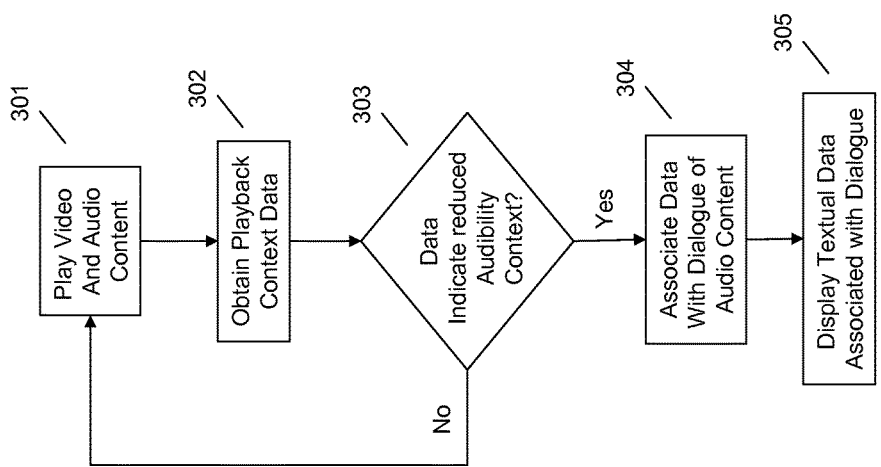
FIG. 3 illustrates an example method for intelligent closed captioning.

As illustrated in FIG. 3, playing of audio and video content at 301 is, according to an embodiment, accompanied by obtaining of playback context data at 302. This playback context data obtained at 302 may be derived from a variety of external sources, including for example gesture data captured by a camera (e.g., user motioning with a hand to his or her ear), biometric data captured with a camera, microphone or other device (e.g., for identifying a specific user or actor/actress), ambient audio data captured with a microphone (e.g., for detecting a sudden environmental noise disrupting audibility, detecting a particular speaker in the environment or in the video and audio data, etc.), and/or display device control data (e.g., low volume setting, repeated pause and rewind events, etc.), as further described herein.

Thus, following the obtaining, from an external source, context data relating to a playback context of the video content and the audio content at 302, an embodiment may determine that the data maps to a reduced audibility context at 303. A variety of techniques may be utilized at 303 to determine if the data indicates a reduced audibility context, either alone or in some combination.

For example, at 303, an embodiment may analyze ambient audio data using a speech recognition engine to assign a confidence score relating to recognition of the ambient audio data. This may correspond to the system determining if the spoken dialogue of the video and audio data, for example captured by a microphone and processed by the speech recognition engine, is comprehensible. An embodiment may therefore associate dialogue of the audio content with the ambient audio data having a low confidence score, at 304, and if the confidence score does not exceed a predetermined threshold, access closed caption data and provide the closed caption data associated with the dialogue having the low confidence score for display at 305.

Again, since the speech processing by the speech recognition engine may be conducted in-line or in real time, a slight delay may exist between the occurrence of the reduced audibility context detection and the presentation of the closed caption data. As such, an embodiment may include a reference to previously displayed video data, e.g., indicating the closed caption data was spoken previously, by a particular character, etc.

As another example, the determination, at 303, may include analyzing, using a speech recognition engine, the ambient audio data to identify a predetermined trigger expression in recognized ambient audio data, e.g., "I can't hear it". If such a trigger expression is detected, an embodiment may likewise access closed caption data and associate, at 304, the closed caption data with the dialogue and the ambient audio data containing the predetermined trigger expression. In this way, an embodiment may display or provide, at 305, textual data corresponding to the dialogue that was spoken during a reduced audibility context. By way of example, the predetermined trigger expression may be detected and mapped using natural language processing to a user provided indication of inadequate audio. This alerts the system to the condition or context in which a user is providing input indicating that textual presentation of dialogue for the video may be helpful.

As another example, analyzing at 303 may include analyzing gesture data using a gesture recognition engine, similar to analyzing audio data for a trigger expression, e.g., a user gesturing with his or her hand that he or she cannot hear the audio content. Thus, an embodiment may identify at 303 a predetermined trigger gesture in the gesture data and at 304 access appropriate closed caption data, e.g., associated in time with the gesture expression. An embodiment may then provide at 305 the closed caption data associated with the dialogue and the predetermined trigger gesture as a textual display, again perhaps with a reference to the previous audio dialogue.

In another example, the system may be customized to a particular user and/or to a particular speaker of the dialogue. By way of example, an embodiment may analyze at 303 captured biometric data, e.g., an image captured by a camera, to identify a specific individual, e.g., a particular user is viewing the video and listening to the audio content. In response to identifying the specific individual, an embodiment may access at 304 appropriate closed caption data, e.g., associated in time with the identification of the specific individual. Thus, an embodiment may provide at 305 the closed caption data associated with the dialogue and the identification of the specific individual for textual display. This may be useful if a particular user is known to have difficulty hearing and/or if a particular user is known to cause audible disruptions (e.g., small children).

In a like example, the speakers of the dialogue (e.g., an actor) may be specifically identified using a biometric analysis to provide textual display of the dialogue associated with that particular individual. This may be accomplished automatically (e.g., by consulting a history of dialogue) and/or may leverage manual input (e.g., a user may indicate a particular actor is difficult to understand, e.g., because of an accent, reduced tone, etc.).

By way of further example, an embodiment may analyze at 303 display device control data, e.g., reduced volume setting, repeated pause rewind events, etc., to identify a display control context indicative of a reduced audibility context. This may be thought of as the system monitoring user feedback (e.g., increasing the volume, rewinding and re-playing video segments to hear the audio again, etc.) in order to infer a reduced audibility context. If such a context is detected by use of the display device control data at 303, an embodiment may then access closed caption data associated in time with the display control context indicative of a reduced audibility context at 304 and thereafter provide the closed caption data for textual display of the dialogue at 305.

If no such reduced audibility context is determined at 303, an embodiment may simply leave the textual display of data off. In this way, unnecessary display of closed caption data may be avoided, enhancing a user's visual experience without burdening them with manually controlling the video playback.

In brief recapitulation, an embodiment monitors the audibility context of a media consumption scenario to intelligently and automatically implements textual display of dialogue, which in many cases will be available from already provided (yet not displayed) closed caption data. In the event that closed caption data is not available, an embodiment may provide the textual display locally, e.g., via speech recognition and speech-to-text processing. Again, to the extent that a delay is introduced, an embodiment may include a reference such that the user is apprised of which audio dialogue the textual display corresponds to. In some embodiments, user inputs and/or a history of user feedback may be used to refine the accuracy and timing with which automated textual displays are presented for dialogues.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal, is non-transitory, and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication or short range wireless communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
playing, on a display device, video content;
providing, using at least one speaker, audio content associated with the video content;
obtaining, from an external source, playback context data, wherein the playback context data comprises contextual data associated with user comprehension of the audio content and wherein the playback context data comprises ambient audio data;
determining, using a processor, that the playback context data is associated with a reduced audibility context, wherein the determining comprises:
analyzing, using a speech recognition engine, the ambient audio data;
identifying a predetermined trigger expression in the ambient audio data;
accessing, responsive to identifying the predetermined trigger expression, closed caption data; and
providing, on the display device, the closed caption data associated with the dialogue and the ambient audio data comprising the predetermined trigger expression.

2. The method of claim 1, further comprising associating, using a processor, the playback context data associated with a reduced audibility context with the dialogue of the audio content.

3. The method of claim 1, wherein the closed caption data includes a reference to previously displayed video data.

4. The method of claim 3, wherein the reference indicates a particular speaker within the video data.

5. The method of claim 1, wherein the predetermined trigger expression is associated using natural language processing to a user provided indication of inadequate audio.

6. An electronic device, comprising:
a speech recognition engine;
a display device;
an input component;
at least one speaker;
one or more processors; and
a memory operatively coupled to the one or more processors, the display device, the at least one speaker, and the input component, the memory storing instructions executable by the one or more processors, the instructions being executable by the one or more processors to:
play, on the display device, video content;
provide, using the at least one speaker, audio content associated with the video content;
obtain, from an external source, playback context data, wherein the playback context data comprises data associated with user comprehension of the audio content and wherein the playback context data comprises ambient audio data;
determine that the playback context data is associated with a reduced audibility context, wherein the instructions executable by the processor to determine comprise instructions executable by the processor to:
analyze the ambient audio data;
identify a predetermined trigger expression in the ambient audio data;
access, responsive to identifying the predetermined trigger expression, closed caption data; and
provide, on the display device, the closed caption data associated with the dialogue and the ambient audio data comprising the predetermined trigger expression.

7. The electronic device of claim 6, wherein the instructions are further executable by the one or more processors to associate the playback context data associated with a reduced audibility context with the dialogue of the audio content.

8. The electronic device of claim 6, wherein the closed caption data includes a reference to previously displayed video data.

9. The electronic device of claim 8, wherein the reference indicates a particular speaker within the video data.

10. A computer program product, comprising:
a storage device that stores instructions executable by a processor, the instructions comprising:
instructions that play, on a display device, video content;
instructions that provide, using at least one speaker, audio content associated with the video content;
instructions that obtain, from an external source, playback context data, wherein the playback context data comprises contextual data associated with user comprehension of the audio content and wherein the playback context data comprises ambient audio data;
instructions that determine, using a processor, that the playback context data is associated with a reduced audibility context, wherein the instructions that determine comprise instructions that:
analyze the ambient audio data;
identify a predetermined trigger expression in the ambient audio data;
access, responsive to identifying the predetermined trigger expression, closed caption data; and
provide, on the display device, the closed caption data associated with the dialogue and the ambient audio data comprising the predetermined trigger expression.

* * * * *